US005522168A

United States Patent [19]
Friddle

[11] Patent Number: 5,522,168
[45] Date of Patent: Jun. 4, 1996

[54] GAME DECOY

[76] Inventor: John W. Friddle, 2225 South Side Rd., Grants Pass, Oreg. 97527

[21] Appl. No.: 272,745

[22] Filed: Jul. 11, 1994

[51] Int. Cl.[6] ............................................. A01M 31/06
[52] U.S. Cl. ........................................ 43/1; 43/2; 135/901
[58] Field of Search .................................. 135/901; 43/2, 43/3, 1; 124/23.1; 446/478, 487

[56] References Cited

U.S. PATENT DOCUMENTS

| | | | |
|---|---|---|---|
| 4,590,699 | 5/1986 | Nicks | 43/2 |
| 4,773,178 | 9/1988 | Marek | 43/2 |
| 4,817,579 | 4/1989 | Mathias | 124/23.1 |
| 4,821,444 | 4/1989 | Remus | 43/2 |
| 4,852,288 | 8/1989 | Payne et al. | 43/2 |
| 5,235,772 | 8/1993 | Mendick, Jr. | 43/1 |

*Primary Examiner*—Jack W. Lavinder
*Assistant Examiner*—Allyson Abrams
*Attorney, Agent, or Firm*—James D. Givnan, Jr.

[57] ABSTRACT

A decoy having a collapsible molded head in place on a pliable backing sheet. The head and sheet components are shaped to simulate a game animal viewed in frontal elevation. A fabric cover encloses the backing member with an opening permitting the head to be attached in place on the backing member. The cover is shaped and colored to simulate an animal chest. An opening in the cover enables sighting through the decoy as well as arrow passage.

11 Claims, 1 Drawing Sheet

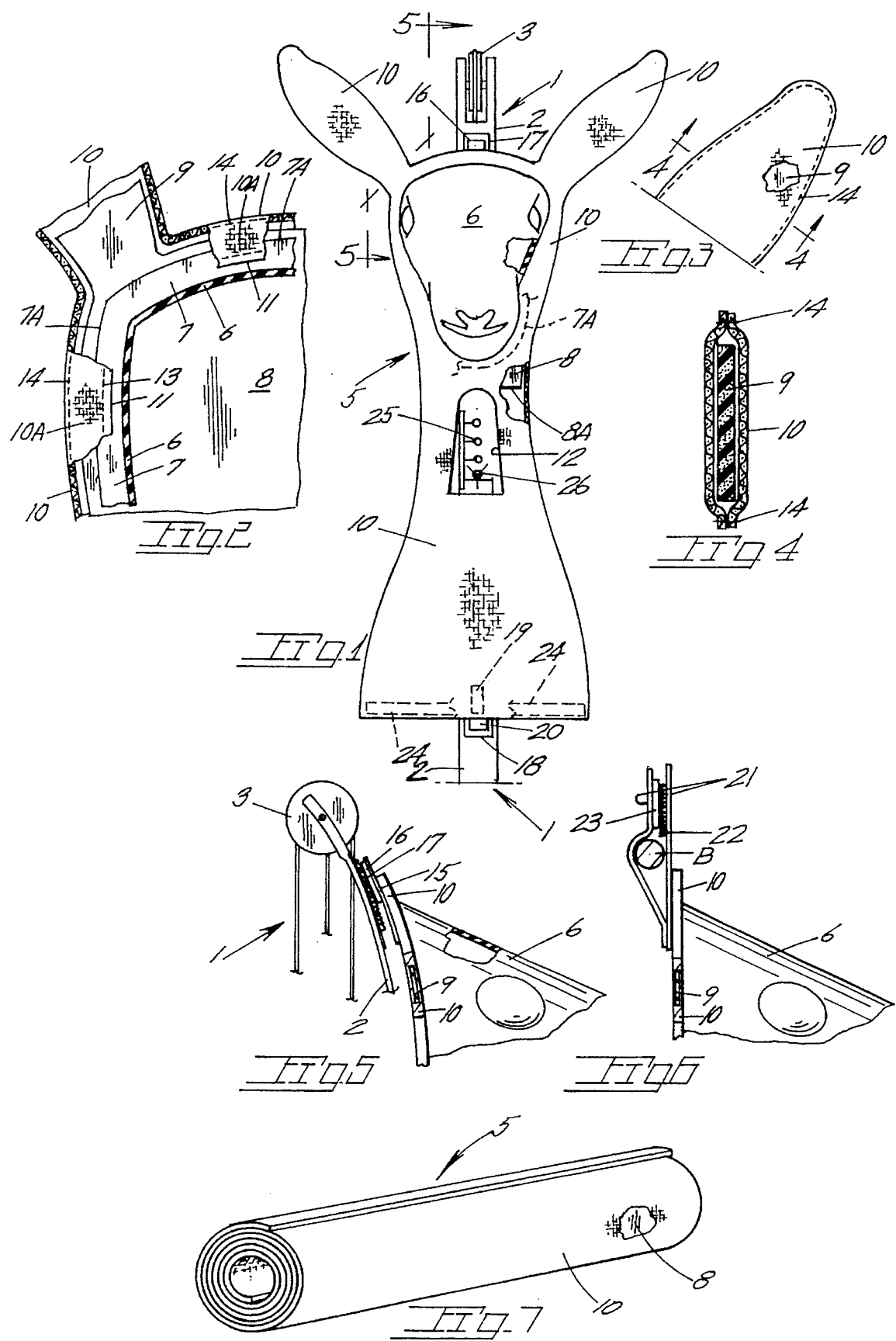

GAME DECOY

BACKGROUND OF THE INVENTION

The present invention pertains to decoys and particularly to decoys of the three dimensional type.

In the bow hunting of deer and other large game animals, it is necessary that the animal be at close range for desired results.

U.S. Pat. No. 4,773,178 discloses a deer decoy constructed from air tight material to permit the decoy to be inflated with means provided for securing the feet of the decoy to a ground surface. Such a decoy requires inflation at a hunting site and subsequent deflation for transport from the site.

The use of a decoy for bow hunters is highly desirable in that bow hunting requires that the animal be at a much closer range than when hunting with a firearm. As a bow hunter must carry the decoy along with other gear it becomes important that a decoy be highly portable and quickly set up at a hunting site.

SUMMARY OF THE PRESENT INVENTION

The present invention is embodied within a decoy which utilizes a collapsible head component having an inherent shape which automatically assumes the desired configuration.

The head portion is fixed to a pliable backing member. A cover about the backing member is of a fabric of a suitable texture and color to further simulate the frontal portion of the game animal being hunted. Both the backing member and the head of the decoy may be reconfigured for ease of carrying to and from a site of decoy use. Positioning means includes closure material in place on the decoy and on a hunting bow to permit the bow to support the decoy with the latter having an opening therein for sighting as well as for release of an arrow. Additional positioning means includes a pair of tabs each equipped with a fabric closure patch for securement of the tabs about a branch or other elevated support. The head portion of the decoy is of pliable molded sheet material which may be collapsed for storage and transport purposes, and upon the decoy being deployed, automatically assumes a predetermined three dimensional shape. The backing sheet is of a high density foam material which imparts desired degree of rigidity to the decoy even in somewhat windy conditions.

Important objectives of the present decoy include a decoy rendering a remarkably accurate simulation of the head and frontal torso of a game animal; the provision of a decoy readily configured for storage or transport purposes yet one rapidly deployed at the site of use; the provision of a decoy suitable for suspension on a hunting bow with provision made for sighting of the bow through the decoy.

BRIEF DESCRIPTION OF THE DRAWINGS

In the accompanying drawings:

FIG. 1 is a front elevational view of the decoy supported in place on a compound hunting bow;

FIG. 2 is a sectional fragmentary view of the decoy showing the interface between the head and backing member of same;

FIG. 3 is a fragmentary elevational view of an ear of the decoy;

FIG. 4 is a sectional view taken along lines 4—4 of FIG. 3;

FIG. 5 is an elevational view taken along line 5—5 of FIG. 1;

FIG. 6 is a view similar to FIG. 5 but disclosing modified support means for the decoy; and FIG. 7 is a perspective view of the decoy in rolled configuration.

DETAILED DESCRIPTION OF THE PREFERRED EMBODIMENT

With continuing attention to the drawings, wherein applied reference numerals indicate parts similarly hereinafter identified, the reference numeral 1 indicates generally a hunting bow of the compound type used by hunters of large game animals. The bow includes upper and lower limbs at 2 with a pulley 3 at its upper extremity about which a bow string is entrained.

With attention to the present decoy, indicated generally at 5, a head 6 is of three dimensional configuration and molded from rubber latex or other suitable pliable material to simulate the head of the particular specie of animal being hunted. The head portion terminates rearwardly of the decoy eyes in a lip or flange 7 which is continuous about the head portion. To assure an inherent shape of the head portion, the same is molded from latex rubber of approximately 1/16th inch thickness.

Supporting the head portion is a backing member 8 of planar shape and of a size to extend outwardly from the outer extremity 7A of flange 7. Backing member 8 may be of a high density foam material as used in carpet padding to impart a degree of rigidity to the decoy to assure maintenance of a desired shape against wind currents. Upward extremities 9 of the backing member simulate the animal's ears.

An exterior covering of the decoy may be a loosely woven fabric 10, such as burlap, shaped to overlie the perimeter of the backing member with an opening therein at 11 and a margin at 10A to overlie flange 7 of the head for stitching thereto at 13. Covering 10 extends downwardly beyond the backing member lower extremity at 8A. An opening at 12 in the frontal portion of the cover serves the hunter to permit sighting the hunting bow as well as release an arrow through the cover. Additional stitching at 14 joins the front and rear cover components along the perimeter of the decoy.

Positioning means for the decoy includes a tab at 15 sewn or otherwise secured to the rear side of the cover and provided with a fabric closure member 16 for engagement with a cooperating fabric closure member 17 affixed to limb 2 of the bow. A bottom pad at 18 on a lower bow limb 2 similarly includes a fabric closure member at 20 while a strap mounted closure member is at 19 and accordingly the decoy is secured against undesired motion. Modified positioning means includes tabs at 21 attached to the rear cover member and each having a closure such as fabric closure members at 22 and 23 for suspending the decoy from a tree branch at B or other elevated support.

To maintain the lower end of cover 10 from undesired movement, a stiffener 24 is insertable between the front and rear expanses of cover 10.

The cover opening 12 permits sighting of a target in sight pin as at 25 and the release of an arrow 26 through the opening.

The backing member 8 is preferably of a high density foam such as quarter inch thick carpet padding rated at CC 200 and having suitable memory.

The back portion of cover 10 is preferably of camouflage mesh while the front portion of the cover is of ten ounce burlap or a canvas material stained or painted with a color simulating the frontal color of the animal being hunted.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A decoy for large game animals comprising, a three dimensional head of a game animal of molded rubber sheet material having an inherent three dimensional shape, a pliable backing member on which said head is supported, said head collapsible against said pliable backing member upon flexing of the backing member to facilitate transport of the decoy, a cover attached to said backing member, means securing said head to said backing member, and positioning means on said cover for attachment of the decoy to a support.

2. The decoy claimed in claim 1 wherein said head terminates rearwardly in a lip for abutment with said backing member.

3. The decoy claimed in claim 2 wherein said means securing said head to said backing member includes stitching, said stitching passing through said cover.

4. The decoy claimed in claim 1 wherein said backing member includes upward extensions simulating the ears of an animal.

5. The decoy claimed in claim 1 wherein said positioning means includes a tab having a first fabric closure member for attachment to a second fabric closure member on said support.

6. The decoy claimed in claim 1 wherein said positioning means includes tabs attached to said cover and first and second fabric closure members one each on said tabs for joining said tabs about said support.

7. The decoy claimed in claim 1 wherein said backing member is of a high density foam material and may be rolled, said head collapsible against said backing member when the latter is rolled to enhance portability of the decoy.

8. The decoy claimed in claim 1 wherein said cover defines an elongate opening through which a hunter may site.

9. In combination, a decoy for large game animals comprising, a three dimensional head of molded rubber sheet material having an inherent shape, a pliable backing member on which said head is supported, said head collapsible against said pliable backing member upon flexing of the backing member for storage purposes, a cover in place about said backing member, means securing said head to said backing member, and first positioning means attached to said cover, a bow having upper and lower limbs and second positioning means in place on said upper and lower limbs, said first and second positioning means engageable to enable support of the decoy on said bow.

10. A decoy for use in hunting of large game animals and comprising, a three dimensional head of a game animal formed of molded rubber sheet material and having an inherent three dimensional shape, a pliable backing member on which said head is supported, upward extensions on said backing member simulating ears of the animal, said head collapsible against said flexible backing member upon flexing of the backing member to facilitate storage of the decoy, a cover attached to said backing member, means securing said head to said backing member, and positioning means on said cover for decoy attachment to a support.

11. The decoy claimed in claim 10 wherein said head terminates rearwardly in a lip for abutment with said backing member.

* * * * *